(12) United States Patent
Kim

(10) Patent No.: US 8,873,002 B2
(45) Date of Patent: Oct. 28, 2014

(54) LIQUID CRYSTAL DISPLAY

(71) Applicant: Samsung Display Co., Ltd., Yongin (KR)

(72) Inventor: Dong-Gyu Kim, Suwon (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/846,707

(22) Filed: Mar. 18, 2013

(65) Prior Publication Data

US 2013/0286336 A1  Oct. 31, 2013

Related U.S. Application Data

(60) Division of application No. 13/193,508, filed on Jul. 28, 2011, now Pat. No. 8,432,514, which is a division of application No. 11/244,099, filed on Oct. 6, 2005, now Pat. No. 8,477,089, which is a continuation of application No. 09/615,794, filed on Jul. 13, 2000, now abandoned.

(30) Foreign Application Priority Data

Jul. 13, 1999 (KR) .................. 10-1999-0028287
Nov. 5, 1999 (KR) .................. 10-1999-0048841
Dec. 31, 1999 (KR) .................. 10-1999-0067761

(51) Int. Cl.
*G02F 1/1333* (2006.01)
*G02F 1/1335* (2006.01)
*G02F 1/1362* (2006.01)

(52) U.S. Cl.
CPC ...... *G02F 1/133512* (2013.01); *G02F 2201/40* (2013.01); *G02F 1/136213* (2013.01); *G02F 1/136209* (2013.01)
USPC ........................................ 349/110

(58) Field of Classification Search
USPC ........................................ 349/110
See application file for complete search history.

(56) References Cited

U.S. PATENT DOCUMENTS

| 4,955,697 A | 9/1990 | Tsukada et al. |
| 5,513,028 A | 4/1996 | Sono et al. |

(Continued)

FOREIGN PATENT DOCUMENTS

| JP | 61-026921 | 2/1986 |
| JP | 61-32087 A | 2/1986 |

(Continued)

OTHER PUBLICATIONS

Patent Abstracts of Japan, Publication No. 09-96839, Apr. 8, 1997, 2 pp.

(Continued)

*Primary Examiner* — Timothy L Rude
(74) *Attorney, Agent, or Firm* — Innovation Counsel LLP

(57) ABSTRACT

A liquid crystal display includes first and second insulating substrates facing each other, and a plurality of pixels comprising a plurality of rows and a plurality of columns and divided into a first pixel group comprising only the pixels on a first row and a second pixel group comprising each of the remaining pixels on second to last rows. The pixels of the first pixel group have a first opening ratio, and the pixels of the second pixel group have a second opening ratio different from the first opening ratio. The first opening ratio is smaller than the second opening ratio, and the first opening ratio is about 60% to about 80% of the second opening ratio; and the pixels of the first pixel group but not the pixels of the second pixel group have a light interception pattern in an opening portion.

1 Claim, 24 Drawing Sheets

(56) References Cited

U.S. PATENT DOCUMENTS

| | | |
|---|---|---|
| 5,646,756 A | 7/1997 | Dohjo et al. |
| 5,686,932 A | 11/1997 | Tomita |
| 5,877,830 A | 3/1999 | Shimada et al. |
| 5,999,155 A | 12/1999 | Satou |
| 6,014,193 A | 1/2000 | Taira et al. |
| 6,577,295 B2 | 6/2003 | Kikkawa |

FOREIGN PATENT DOCUMENTS

| | | |
|---|---|---|
| JP | 01-197722 | 8/1989 |
| JP | 04-198921 | 7/1992 |
| JP | 06-337438 A | 12/1994 |
| JP | 09-96839 | 4/1997 |
| JP | 09-160002 A | 6/1997 |
| JP | 09-160015 A | 6/1997 |
| JP | 09-211480 | 8/1997 |
| JP | 09-311351 A | 12/1997 |
| JP | 10-020335 A | 1/1998 |
| JP | 10-062812 A | 3/1998 |
| JP | 11-052351 | 2/1999 |
| JP | 11-095202 | 4/1999 |
| JP | 11-133455 A | 5/1999 |
| JP | 10-2004-58835 | 11/2004 |
| KR | 10-1998-74474 | 11/1998 |
| KR | 100458835 | 11/2004 |

OTHER PUBLICATIONS

Korean Patent Abstracts, 10-1998-74474, Nov. 5, 1998, 1 p.

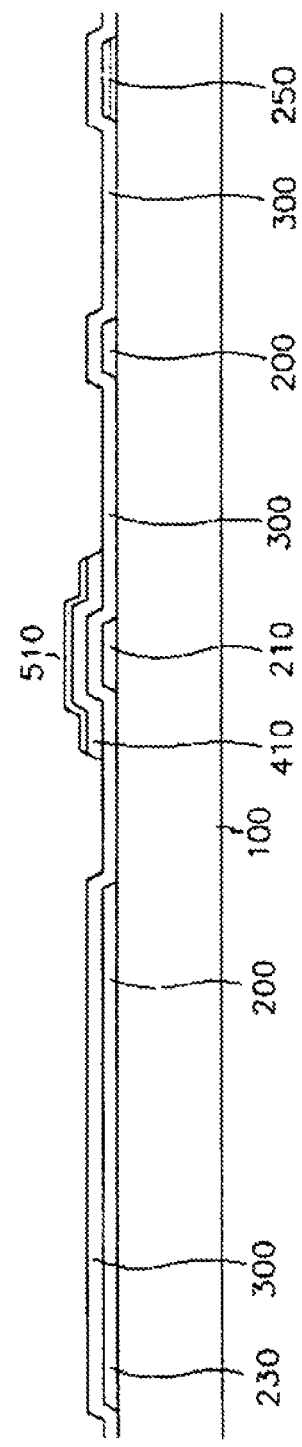

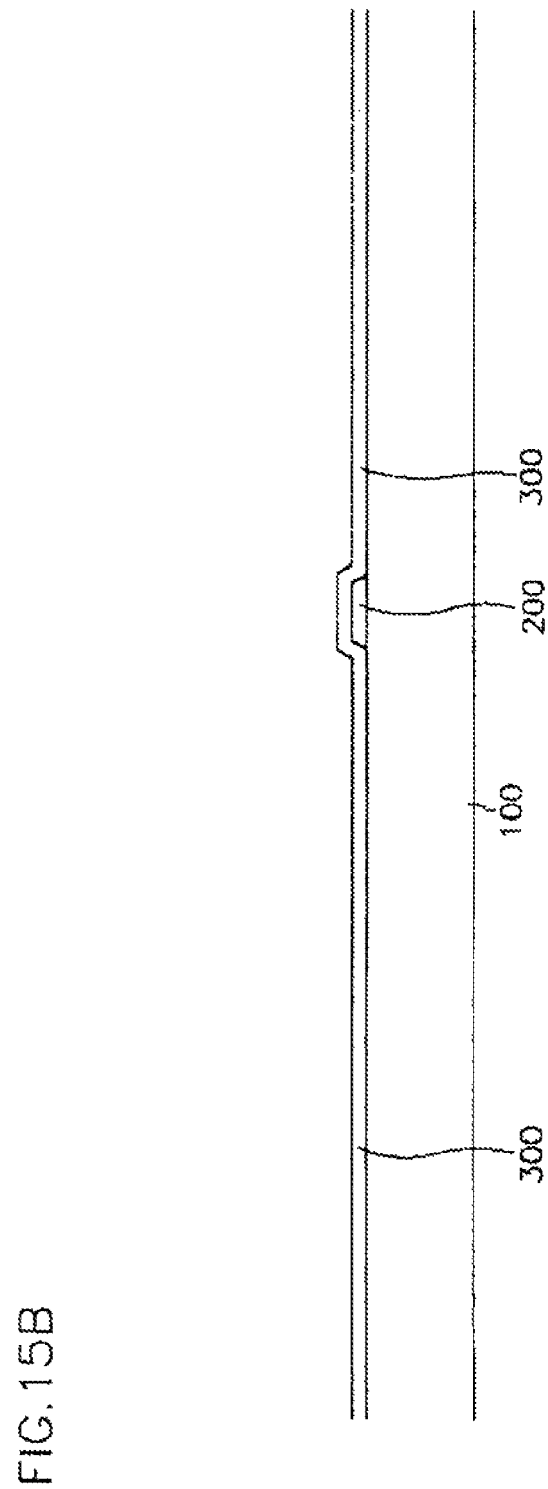

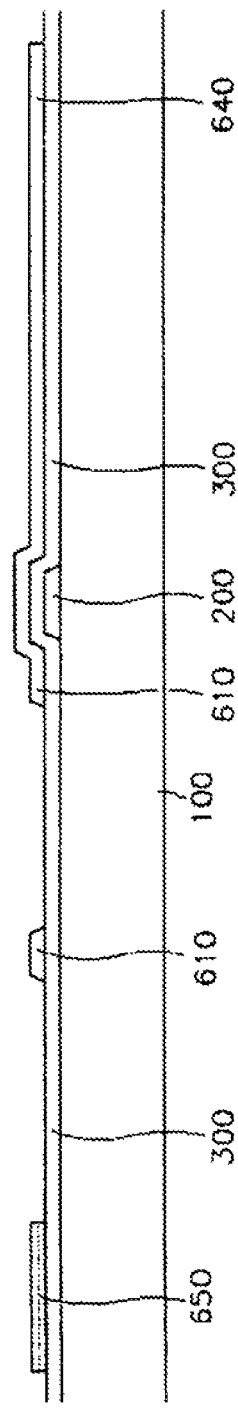

LIQUID CRYSTAL DISPLAY

CROSS REFERENCE TO PRIOR APPLICATIONS

This application is a Divisional of U.S. patent application Ser. No. 13/193,508 filed Jul. 28, 2011 which is a Divisional of U.S. patent application Ser. No. 11/244,099 filed Oct. 6, 2005, which is a Continuation Application of U.S. patent application Ser. No. 09/615,794 filed Jul. 13, 2000, which claims priority to and the benefit of Korean Patent Application Nos. 10-1999-0028287 filed on Jul. 13, 1999; 10-1999-0048841 filed on Nov. 5, 1999; and 10-1999-0067761 filed Dec. 31, 1999, which are incorporated herein by reference in their entireties.

BACKGROUND OF THE INVENTION (a) Field of the Invention

The present invention relates to a liquid crystal display and, more particularly, to a liquid crystal display which bears uniform brightness characteristic over the entire screen area without leakage of light.

(b) Description of the Related Art

Generally, a liquid crystal display has an upper substrate with a common electrode and color filters (usually called the "color filter substrate"), a lower substrate with thin film transistors and pixel electrodes (usually called the "TFT array substrate"), and a liquid crystal layer sandwiched between the color filter substrate and the TFT array substrate. Different electrical potentials are applied to the pixel electrodes and the common electrode while forming electric fields to change the liquid crystal molecule orientation. In this way, the light transmission is controlled to display picture images.

In such a liquid crystal display, with only a TFT attached to it, the charge applied to switch the liquid crystal leaks away in a brief time after a signal arrives. Therefore, it is necessary to connect an additional capacitor to the liquid crystal so that the liquid crystal is able to retain the charge associated with the first signal until a second signal is received.

For example, a capacitance may be conferred on a liquid crystal by using an adjacent gate electrode line.

Each pixel electrode overlaps over the previous gate line with an insulating layer interposed to form a storage capacitance Cst. The pixel electrode faces the common electrode with a liquid crystal layer interposed to form a liquid crystal capacitance Clc. Furthermore, a parasitic capacitance Cgd is formed between a gate electrode and a drain electrode.

The voltage applied between each pixel electrode and the common electrode changes at 60 Hz (60 frames per second). Within one frame, pulses of Von are applied to sequentially turn on TFTs from the first gate line to the last gate line. In case the Von pulse is applied to a particular gate line, off-voltages Voff are applied to the other gate lines. When the voltage applied to the common electrode Vcom is set to 5 V, the on-voltage Von becomes to be about 20 V, and the off-voltage Voff to be about −7 V. When the on-voltage Von is applied to a particular gate line, the TFTs positioned at that line are in an on-state, and the picture signal voltages applied to the data lines are transmitted to the pixel electrodes. In contrast, when the off-voltage Voff is applied to the TFTs at the particular gate line while applying Von to the previous gate line, the electric potential Vg of the previous gate line is elevated by 27 V from −7 V to 20 V. At this time, the electric potential of the pixel electrode Vp is also increased. The amount of increased potential of the pixel electrode ΔVp can be expressed by the following equation: ΔVp=[Cst/(Cst+Clc+Cgd+other parasitic capacitance)]×ΔVg(=27 V).

At this time, the liquid crystal capacitance Clc as a function of voltage difference between Vcom and Vp as well as the parasitic capacitance Cgd are varied together. Thereafter, when the previous gate line is shifted from Von to Voff, the electric potential of the pixel electrode Vp returns to the initial state, but not the liquid crystal capacitance Clc and the parasitic capacitance Cgd due to voltage dependence thereof. As such a variation in electrical potentials of the pixel electrodes at the second to last gate lines are made in the same pattern, the pixel electrode portions at the second to last gate lines bears uniform brightness at the same gray scale. However, since the pixel electrodes at the first gate line have no previous gate line, the electrical potentials of those electrodes change in different manner and the brightness becomes different in the same gray scale. As the brightness at the first gate line portion is usually brighter compared to other gate line portions, the picture images displayed at that portion disturbs the human eye.

In order to solve such a problem, the technique of adding a storage capacitor line G0 and connecting it to the second gate line G2 or the last gate line Gm has been proposed. However, when the G0 line is connected to the G2 line, the integrated circuit (IC) for driving the G2 line should be also employed for driving the G0 line, resulting in shortage in driving current. Accordingly, the second gate line portion becomes much brighter than other gate line portions at a normally white mode. This phenomenon becomes serious as the electric load applied to each gate line becomes greater with the trend of high definition and increased screen size. In contrast, when the G0 line is connected to the Gm line, complicated wiring via printed circuit boards (PCBs) should be made to interconnect the G0 line and the Gm line, and the first and the last gate line portions differs in brightness from the other gate line portions.

In the meantime, the TFT array substrate usually has a size larger than the color filter substrate. In this connection, when assembled, the periphery of the TFT array substrate without the corresponding black matrix portion is exposed to the outside so that light leaks at the exposed portion.

SUMMARY OF THE INVENTION

It is an object of the present invention to provide a liquid crystal display which bears good picture quality with uniform brightness characteristic over the entire screen area.

It is another object of the present invention to provide a liquid crystal display which effectively prevents light leakage without generating short circuits.

These and other objects may be achieved by employing in a liquid crystal display light interception patterns. Alternatively, a liquid crystal display may have a black matrix with openings of different sizes depending on the pixel positions. A manufacturing method is also disclosed.

According to one aspect of the present invention, the liquid crystal display includes first and second insulating substrates facing to each other, and a liquid crystal injected into the gap between the first and second substrates. A plurality of gate lines is formed at the first substrate to transmit scanning signals, and data lines cross over the gate lines to transmit picture signals. Pixels are demarcated by the gate lines and the data lines. The gate lines demarcate the pixels into rows, and the data lines demarcate the pixels into columns. A black matrix defines each pixel, and a pixel electrode is formed at each pixel. A storage capacitor line is formed at the first substrate parallel to the gate line, and overlapped with the pixel electrodes at the first pixel row. Storage capacitors are formed between the pixel electrodes and the previous gate lines as well as between the pixel electrodes and the storage capacitor line. A gate-off voltage or a common electrode voltage is applied to the storage capacitor line. Each pixel at the first pixel row with the storage capacitor formed between the corresponding pixel electrode and the storage capacitor line has an opening ratio different from that of the pixels at the other pixel rows. The opening ratio of the first pixel row is established to be 60-80% of the opening ratio of the other pixel rows.

The opening ratio is made different by forming a light interception pattern at each pixel of the first pixel row, or by changing opening volumes of the black matrix. The light interception pattern may be formed at the same layer as the data line or the gate line with the same material.

A gate-off line is formed at the first substrate to transmit a gate-off voltage, and the gate-off line and the storage capacitor line are formed at the same layer as the gate line. The gate-off line and the storage capacitor line are electrically connected to each other via a connection member, and the connection member is formed at the same layer as the data line or the pixel electrode.

In the above structure, uniform brightness over the entire screen area can be ensured.

According to another aspect of the present invention, the liquid crystal display includes a first insulating substrate, and a gate line assembly formed at the first insulating substrate. The gate line assembly has a plurality of gate lines, gate electrodes branched from the gate lines, and gate pads connected to the gate lines to transmit scanning signals thereto. First light interception patterns are isolated from the gate line assembly. A gate insulating layer covers the gate line assembly and the first light interception patterns. A semiconductor layer is formed on the gate insulating layer, and an ohmic contact layer is formed on the semiconductor layer. A data line assembly is formed on the semiconductor layer and the gate insulating layer. The data line assembly has a plurality of data lines crossing over the gate lines while forming pixel areas, source electrodes branched from the data lines, drain electrodes positioned opposite to the source electrodes while centering around the gate electrodes, and data pads connected to the data lines to transmit picture signals thereto. The pixel areas collectively forms a display area. Second light interception patterns are isolated from the data line assembly. A protective layer covers the data line assembly and the second light interception patterns while forming first to third contact holes exposing the gate pad, the data pad and the drain electrode, respectively. Pixel electrodes are connected to the drain electrodes via the third contact hole. A subsidiary gate pad covers each gate pad via the first contact hole, and a subsidiary data pads covers each data pad via the second contact hole.

A second insulating substrate faces the first substrate, and color filters are formed at the second substrate while corresponding to the pixel areas. A black matrix is formed at the second substrate while surrounding the color filters, and a common electrode covers the color filters and the black matrix. A sealer seals the first and second substrates together.

The first and second light interception patterns are positioned outside of the display area such that they are overlapped with the black matrix, but not with the gate and data lines, and the sealer.

In the above structure, possible light leakage can be prevented with the light interception patterns without generating short circuits.

BRIEF DESCRIPTION OF THE DRAWINGS

A more complete appreciation of the invention, and many of the advantages thereof, will be readily apparent as the same becomes better understood by reference to the following detailed description when considered in conjunction with the accompanying drawings in which like reference symbols indicate the same or the similar components, wherein:

FIGS. 14A to 17B are views sequentially illustrating the steps of processing the liquid crystal display shown in FIG. 10;

DETAILED DESCRIPTION OF THE PREFERRED EMBODIMENTS

Preferred embodiments of this invention will be explained with reference to the accompanying drawings.

Figure 1:
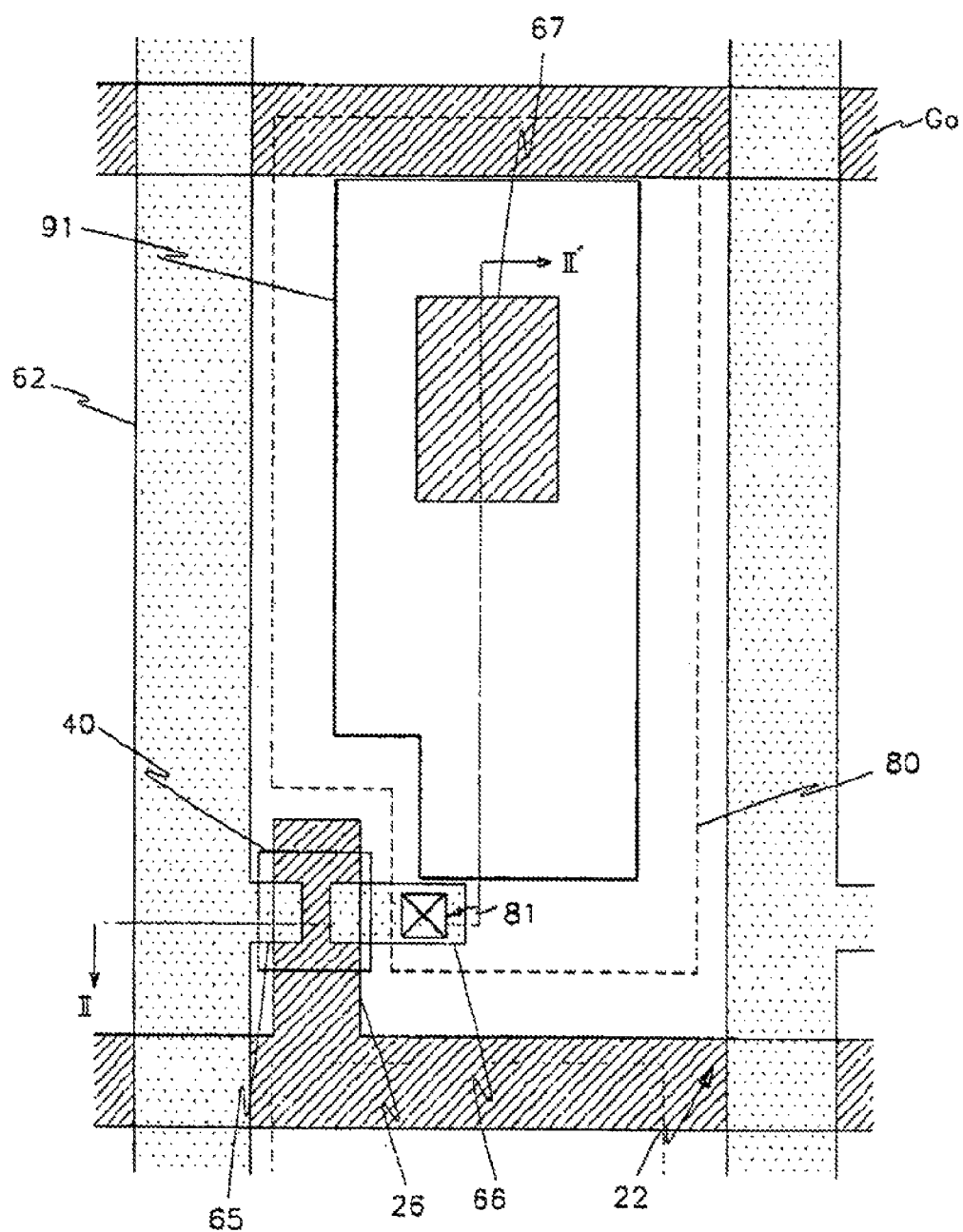
FIG. 1 is a plan view of a liquid crystal display according to a first preferred embodiment of the present invention.
Figure 2:
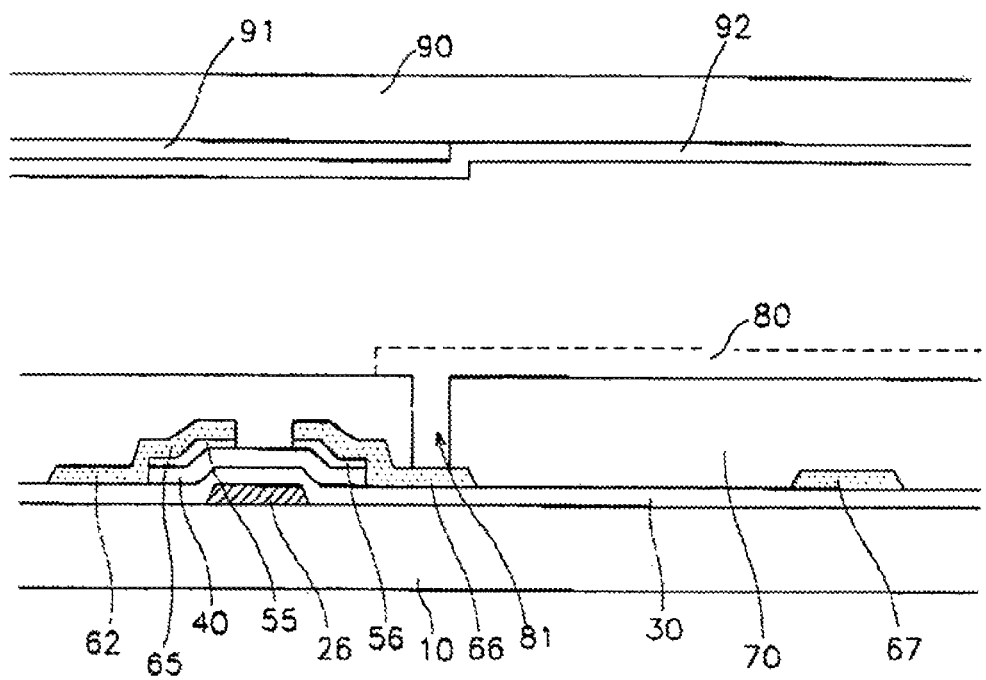
FIG. 2 is a cross sectional view of the liquid crystal display taken along the II-II' line of FIG. 1.

FIG. 1 is a plan view of a liquid crystal display according to a first preferred embodiment of the present invention where one pixel area of the first pixel row is illustrated, and FIG. 2 is a cross sectional view of the liquid crystal display taken along the II-II' line of FIG. 2. The liquid crystal display according to the present invention has a basic structure where a liquid crystal layer is sandwiched between upper and lower substrates with a plurality of pixel areas at different pixel rows, and the following description will be made with respect to one pixel area at the first pixel row.

As shown in the drawings, the lower substrate 10 is overlaid with a first gate line 22 proceeding in the horizontal direction, a gate electrode 26 branched perpendicularly from the first gate line 22 and a storage capacitor line G0 proceeding parallel to the first gate line 22. A gate insulating layer 30 is formed on the gate line 22, the gate electrode 26, and the storage capacitor line G0. A semiconductor layer 40 is formed on the gate insulating layer 30 over the gate electrode 26, and a data line 62 is formed on the gate insulating layer 30 while crossing perpendicularly over the first gate line 22 and the storage capacitor line G0. A source electrode 65 is branched perpendicularly from the data line 62. A drain electrode 66 is positioned at the same plane as the source electrode 65 opposite thereto while centering around the gate electrode 26. The source and drain electrodes 65 and 66 are placed over the semiconductor layer 40 by interposing ohmic contact layers 55 and 56.

Of course, the storage capacitor line G0 may be referred to as the first gate line if it functions as an electrode part of a storage capacitor for the first pixel row.

A light interception pattern 67 is centrally formed at the pixel area with the same plane as the data line 62, the source electrode 65 and the drain electrode 66. A protective layer 70 is formed on the data line 62, the source electrode 65 and the drain electrode 66 with a contact hole 81 exposing the drain electrode 66. A pixel electrode 80 is formed on the protective layer 70, and connected to the drain electrode 66 via the contact hole 81. The pixel electrode 80 is formed with a transparent material such as indium tin oxide (ITO), and partially overlapped with the storage capacitor line G0. Each pixel area is demarcated by the two data lines 62 crossing over the neighboring two gate lines, and the pixel electrode 80 covers the entire pixel area.

A black matrix 91 and color filters (not shown) are formed on the upper substrate 90 such that they face the lower substrate 10. The black matrix 91 is formed of opaque material that can prevent light leakage. It also defines each pixel area. A common electrode 92 is formed on the black matrix 91 and the color filters. It covers the entire upper substrate 90. Alternatively, the black matrix 91 and the color filters may be formed at the lower substrate 10.

In the above pixel structure, the pixel electrodes 80 at the first pixel row overlap the storage capacitor line G0 to form a desired storage capacitance. On the other hand, the pixel electrodes 80 of the second to the last pixel rows overlap the previous corresponding gate lines 22 respectively.

The first pixel row has an opening ratio lower than that of the other pixel rows due to the presence of the light interception patterns 67.

The light interception pattern 67 may be formed either at the same layer as the data line 62, the source electrode 65 and the drain electrode 66, or at the same layer as the gate line 22 and the gate electrode 26.

Figure 3:
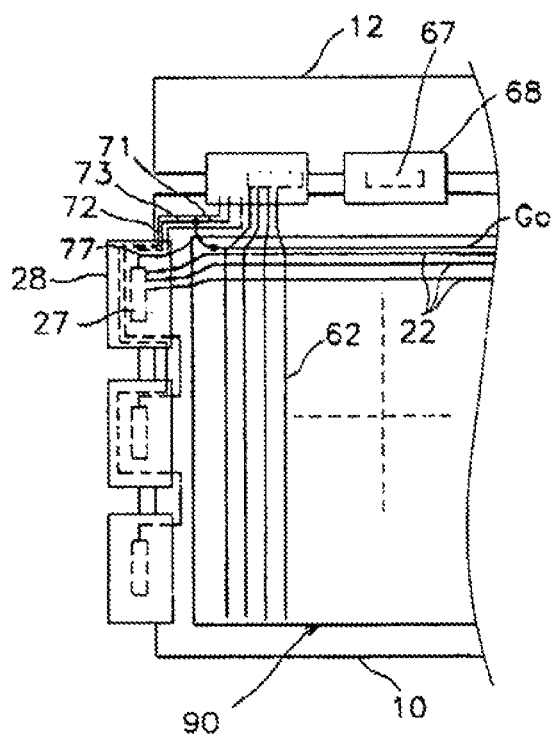
FIG. 3 is another plan view of the liquid crystal display shown in FIG. 1 illustrating the wiring structure.

As shown in FIG. 3, when the lower substrate 10 is combined with the upper substrate 90, the periphery of the lower substrate 10 is exposed to the outside because it is larger than the upper substrate 90. Gate signal transmission films 28 are arranged at the exposed portion of the lower substrate 10 in the longitudinal direction of the data lines 62. Each gate signal transmission film 28 is provided with a gate driving integrated circuit 27. The gate driving integrated circuit 27 is electrically connected to the gate lines 22, and outputs gate driving signals. Data signal transmission films 68 are arranged at the exposed portion of the lower substrate 10 in the longitudinal direction of the gate lines 22. Each data signal transmission film 68 is provided with a data driving integrated circuit 67. The data driving integrated circuit 67 is electrically connected to the data lines 62, and outputs data driving signals. Furthermore, a printed circuit board 12 for driving the liquid crystal display is connected to the data signal transmissions 68.

Meanwhile, a common electrode wire 71 for applying the common electrode voltage Vcom to the common electrode 92, a gate-on wire 72 for applying the on-voltage Von to the TFTs, and a gate-off wire for applying the off-voltage Voff to the TFTs are formed on the edge portion of the lower substrate 10 between the gate signal transmission film 28 and the data signal transmission film 68. Additional wires for transmitting carry-in or gate-clock signals may be further provided.

Figure 4:
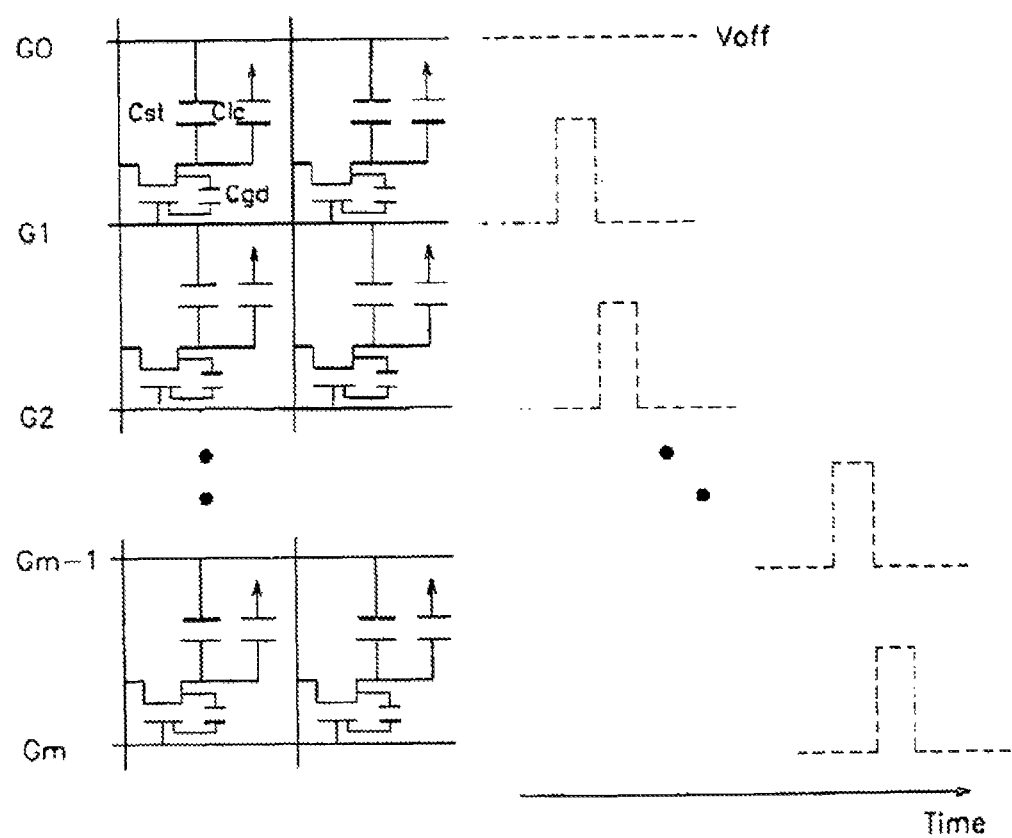
FIG. 4 is a circuit diagram of the liquid crystal display shown in FIG. 1.

As shown in FIGS. 3 and 4, the storage capacitor line G0 at the first pixel row is connected to the gate-off wire 73 via a connection member such that the gate-off voltage Voff is transmitted thereto. It is preferable that the common electrode wire 71, the gate-on wire 72 and the gate-off wire 73 are formed at the same layer as the storage capacitor line G0 and the gate lines 22 with the same material. The connection member 77 is formed at the same layer as the data lines 62 or the pixel electrodes 80 with the same material. The protective layer 70 or the gate insulating layer 30 has a contact hole that receives the connection member 77.

Because the substrate 10 has the wires 71 to 73 that transmit appropriate signals to the gate driving integrated circuit 27, a connector that interconnects a gate printed circuit board and a data printed circuit board may be eliminated. Furthermore, as in this preferred embodiment, only the data printed circuit board may be used without the gate printed circuit board.

The gate driving integrated circuit 27 and the data driving integrated circuit 67 may be directly mounted onto the lower substrate 10.

As described above, the opening ratio of the first pixel row is lower to compensate a possible increase in brightness at the first pixel row when applying the off-voltage Voff to the storage capacitor line G0. Furthermore, even though slight darkness is present at the first pixel row portion due to the presence of the light interception patterns 67, it is not unpleasant to the eye, producing good picture quality.

It turns out that the optimal opening ratio of the first pixel row lies in the range of 60-80% of the other pixel rows. Of course, such a value may be slightly different depending upon the factors such as light transmission, Clc, or Cst.

In this way, the resulting liquid crystal display can bear good picture quality by compensating brightness differences with a simplified wiring structure.

Alternatively, in order to reduce the opening ratio of the first pixel row, the opening portions of the black matrix 91 at the first pixel row may be reduced to be smaller than those of the black matrix 91 at the other pixel rows.

Figure 5:
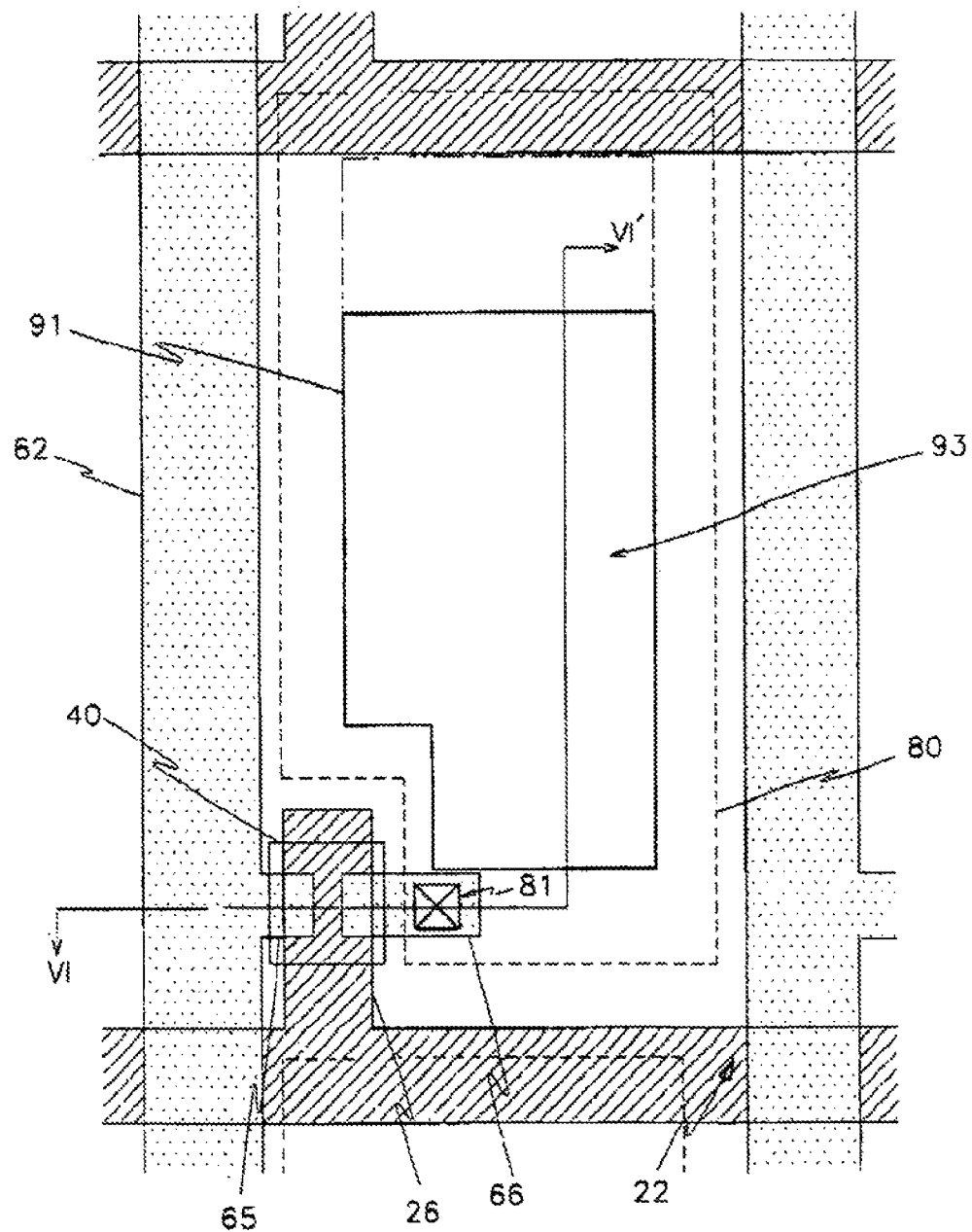
FIG. 5 is a plan view of a liquid crystal display with a black matrix according to a second preferred embodiment of the present invention.
Figure 6:
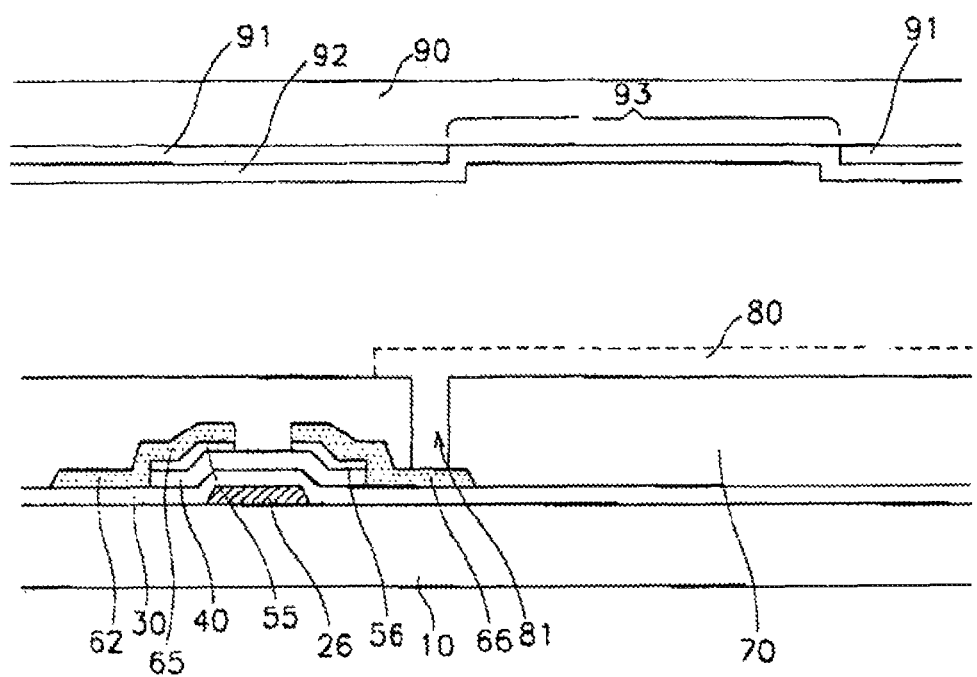
FIG. 6 is a cross sectional view of the liquid crystal display taken along the VI-VI' line of FIG. 5.

FIG. 5 is a plan view of a liquid crystal display according to a second preferred embodiment of the present invention where one pixel area at the first pixel row is illustrated, and FIG. 6 is a cross sectional view of the liquid crystal display taken along the VI-VI' line of FIG. 5. In this preferred embodiment, other components and structures of the liquid crystal display are the same as those related to the first preferred embodiment except that the first pixel row's opening portions of the black matrix 91 are different in lengths from the other pixel rows and that the light interception patterns 67 is eliminated.

Figure 7:
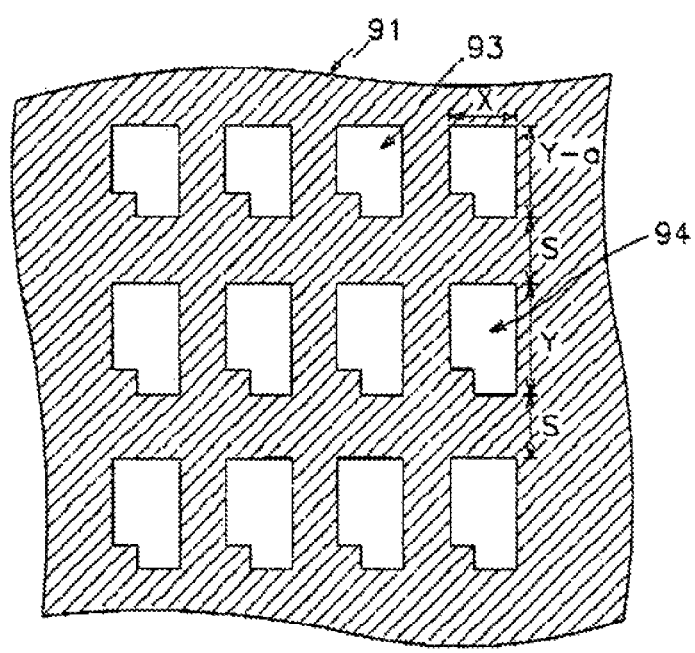
FIG. 7 is a plan view of the black matrix shown in FIG. 5.

As shown in FIG. 7, the opening portions 93 of the black matrix 91 at the first pixel row are designed to have a smaller length than the opening portions 94 at the other pixel rows to reduce the opening ratio of the first pixel row. That is, the opening portions 94 of the black matrix 91 at the second to last pixel rows have a width X and a length Y while being spaced apart from each other with a distance S on the row by row basis. However, the opening portions 93 of the black matrix 91 at the first pixel row have a length Y-a to be 60 to 80% of the length Y of the other opening portions 94.

The structure where only the length of the opening portions 93 of the black matrix 91 at the first pixel row becomes decreased with a uniform width can produce better picture images. Of course, it is possible that the width and length of the opening portions 93 of the black matrix 91 at the first pixel row are all decreased to reduce the opening ratio at those portions.

Figure 8:
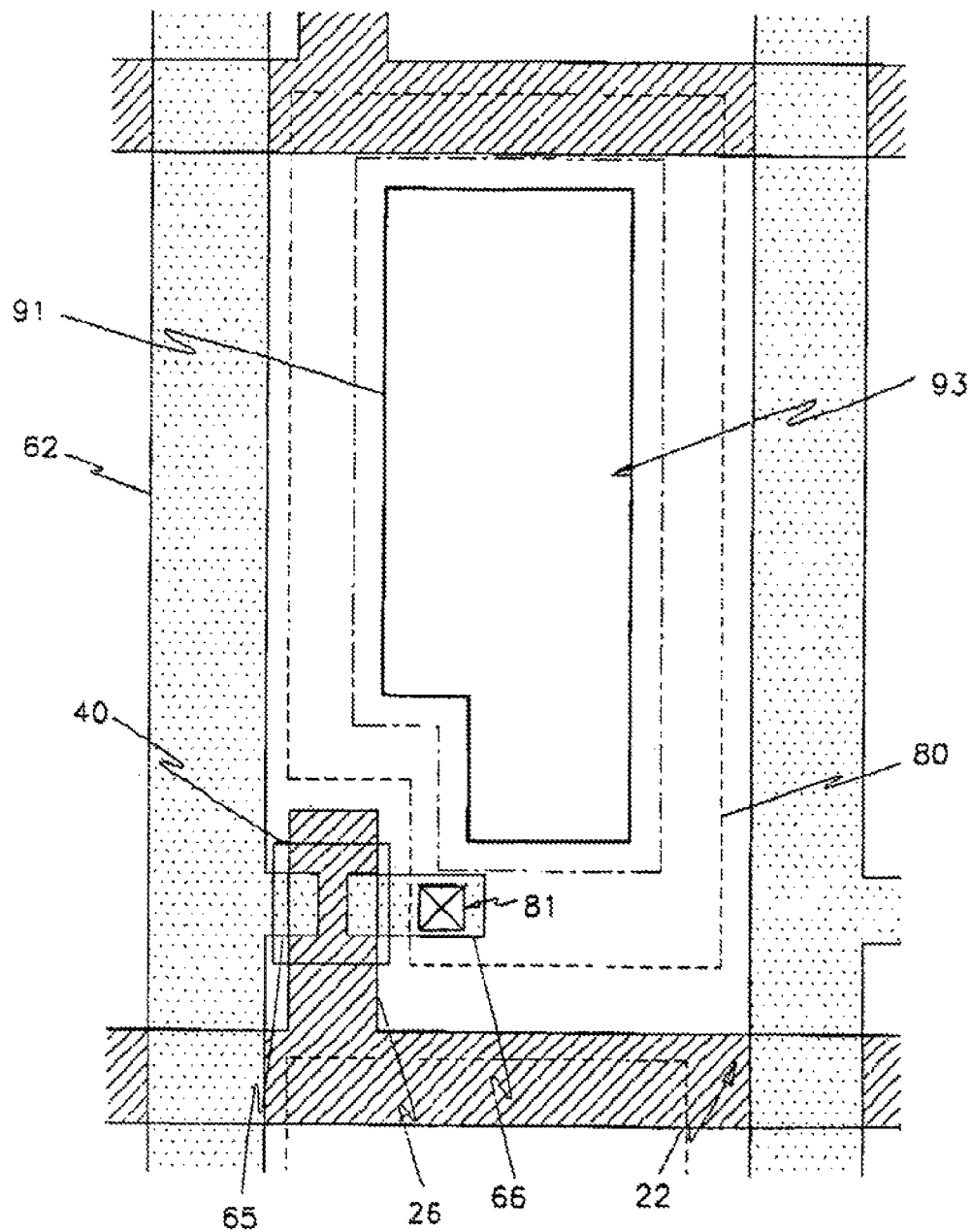
FIG. 8 is a plan view of a liquid crystal display according to a third preferred embodiment of the present invention.
Figure 9:
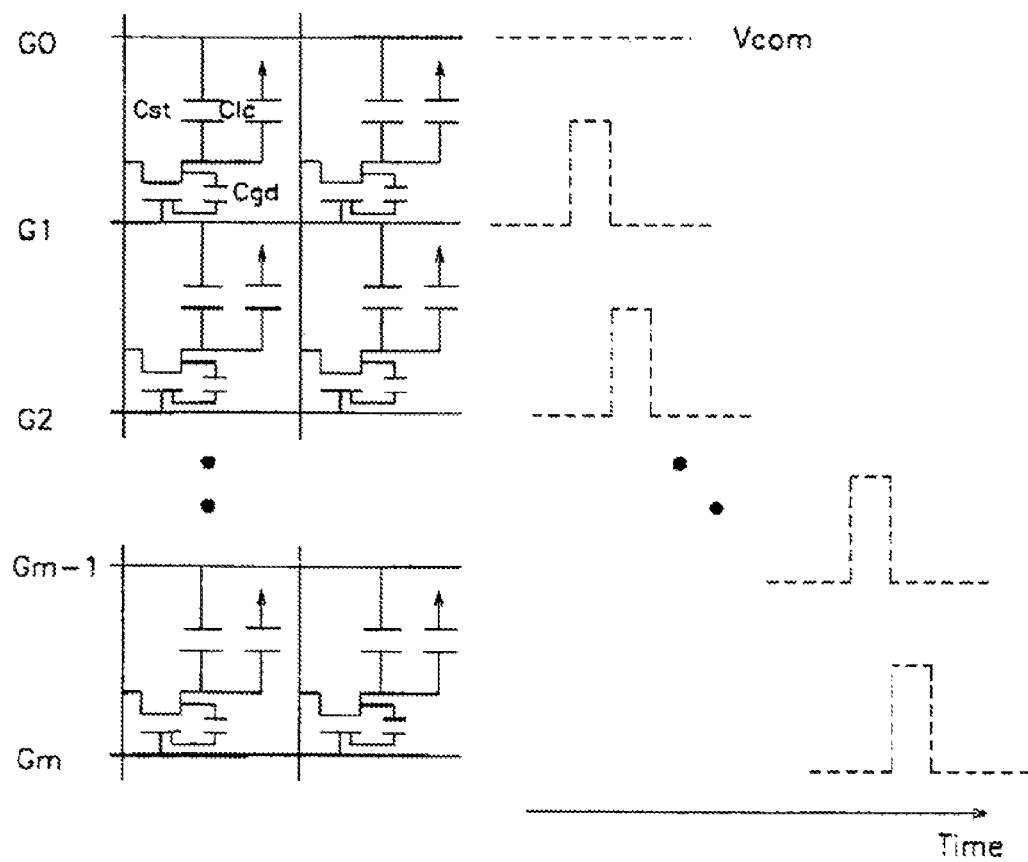
FIG. 9 is a circuit diagram of the liquid crystal display shown in FIG. 8.

FIGS. 8 and 9 illustrate a liquid crystal display according to a third preferred embodiment of the present invention. In this preferred embodiment, other components and structures of the liquid crystal display are the same as those related to the second preferred embodiment except that the common electrode voltage Vcom is applied to the storage capacitor electrode G0 at the first pixel row, and the opening width and length of the black matrix 91 at the first pixel row are all designed to be shorter than those of the black matrix 91 at the other pixel rows.

Figure 10:
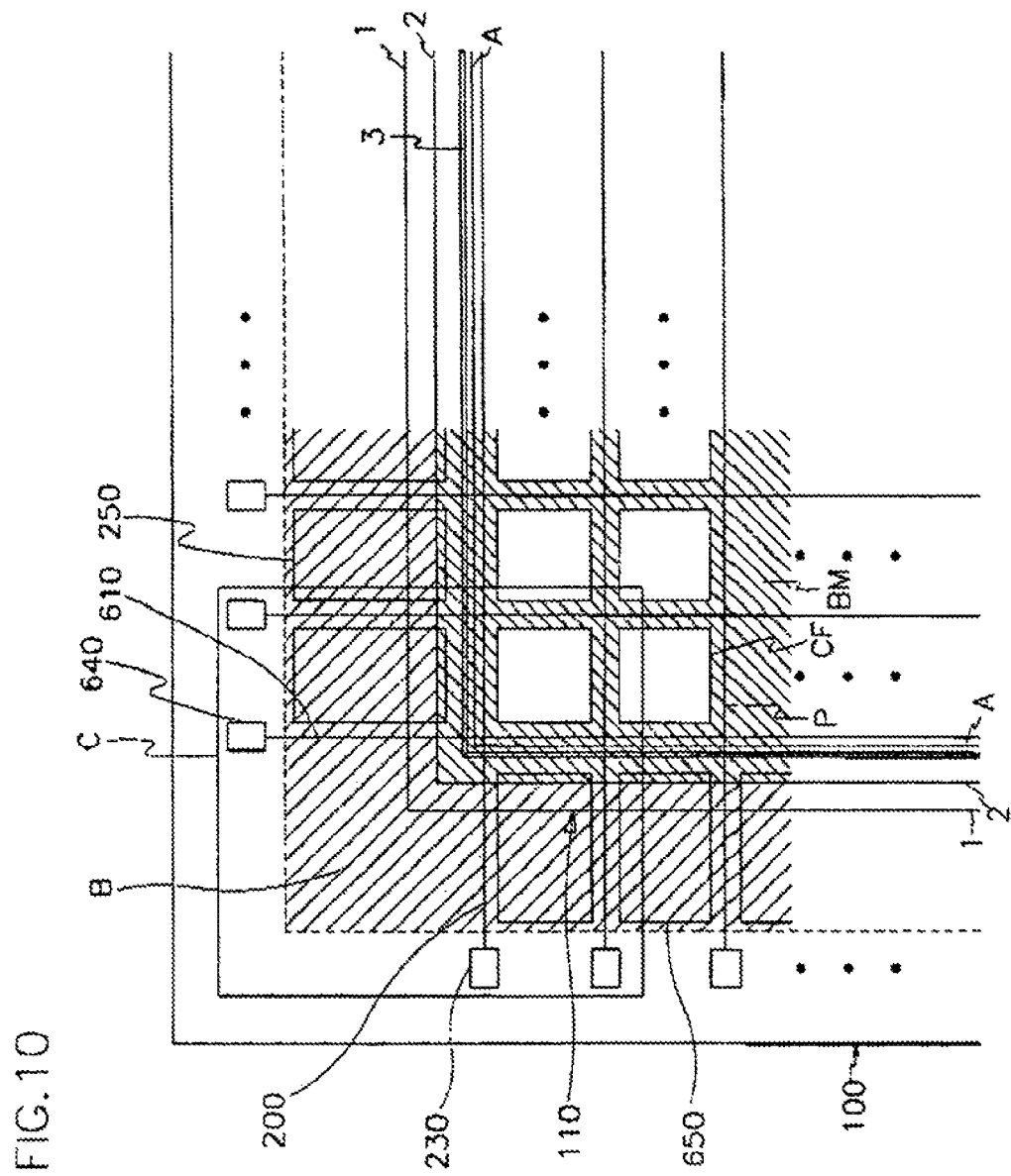
FIG. 10 is a plan view of a liquid crystal display according to a fourth preferred embodiment of the present invention.

FIG. 10 is a plan view of a liquid crystal display according to a fourth preferred embodiment of the present invention where a TFT array substrate 100 and a color filter substrate 110 are assembled via a sealer 3. Since the TFT array substrate 100 is larger than the color filter substrate 110, it is partially exposed to the outside.

As shown in FIG. 10, a plurality of gate lines 200 are formed at the TFT array substrate 100 in the horizontal direction, and gate pads 230 are connected to the end portions of the gate lines 200. A plurality of data lines 610 are formed at the TFT array substrate 100 in the vertical direction, and data pads 640 are connected to the end portions of the data lines 610.

A plurality of pixel areas P are existent at the TFT array substrate 100. Each pixel area P is defined by the two data lines 610 crossing over the neighboring gate lines 200, and a display area A can be indicated by the sum of the pixel areas P. A sealer 3 externally surrounds the display area A.

Color filters CF are formed at the color filter substrate 110 such that each color filter CF faces the corresponding pixel area of the TFT array substrate 100. A black matrix BM surrounds the color filters CF such that it can prevent light leakage at the region between the neighboring pixel areas. As indicated in FIG. 10 with the solid line 2, the peripheral portion of the black matrix BM is placed inside the peripheral portion of the color filter substrate 110 while being positioned outside the sealer 3.

In the above structure, lights tend to leak at the region B between the gate and data pads 230 and 640 and the black matrix BM. In order to prevent such a light leakage, light interception patterns 250 and 650 are formed at that region B such that they do not overlap the gate and data lines 200 and 610, and the gate and data pads 250 and 650. Furthermore, the light interception patterns 230 and 640 should not be overlapped with the sealer 3, but may be overlapped with the black matrix BM.

Alternatively, the color filters CF and the black matrix BM may be formed at the TFT array substrate 100.

Figure 11:
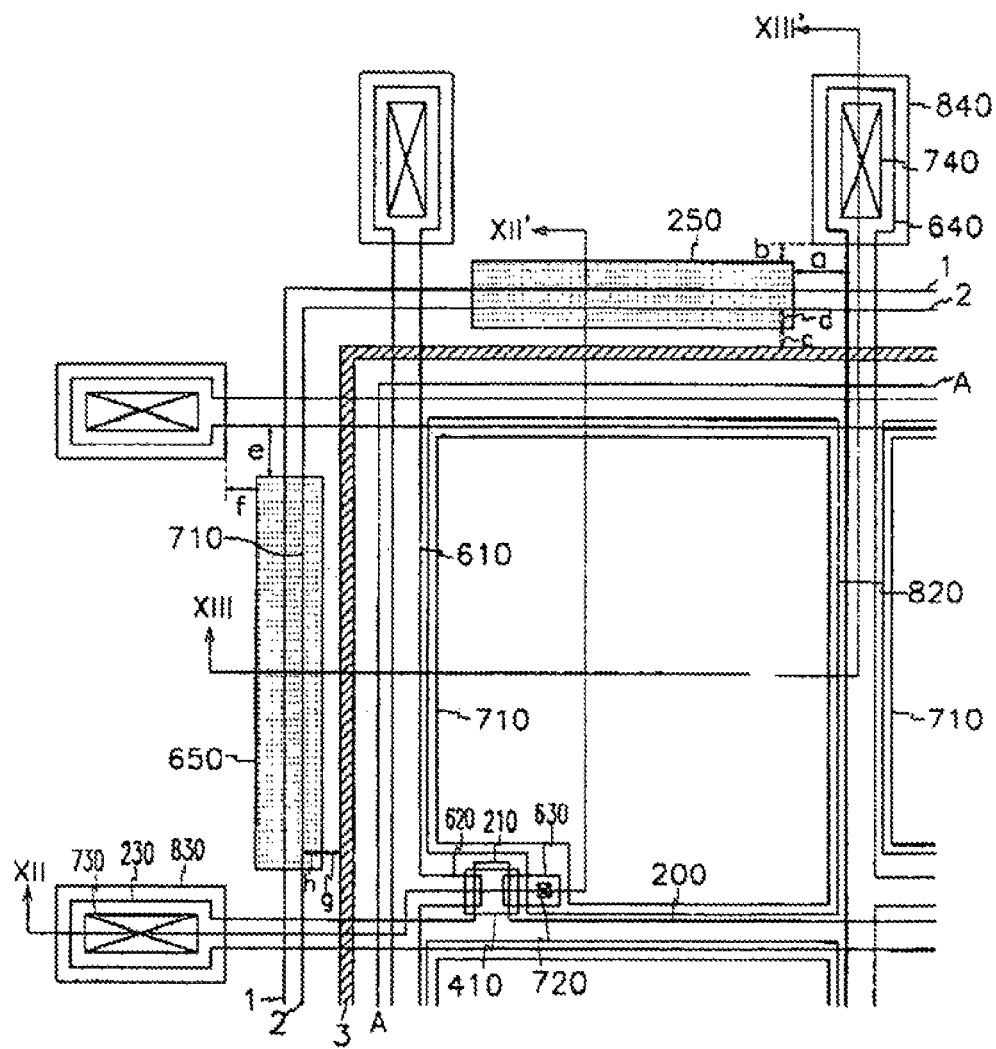
FIG. 11 is another plan view of the liquid crystal display shown in FIG. 10 illustrating the wiring structure.
Figure 12:
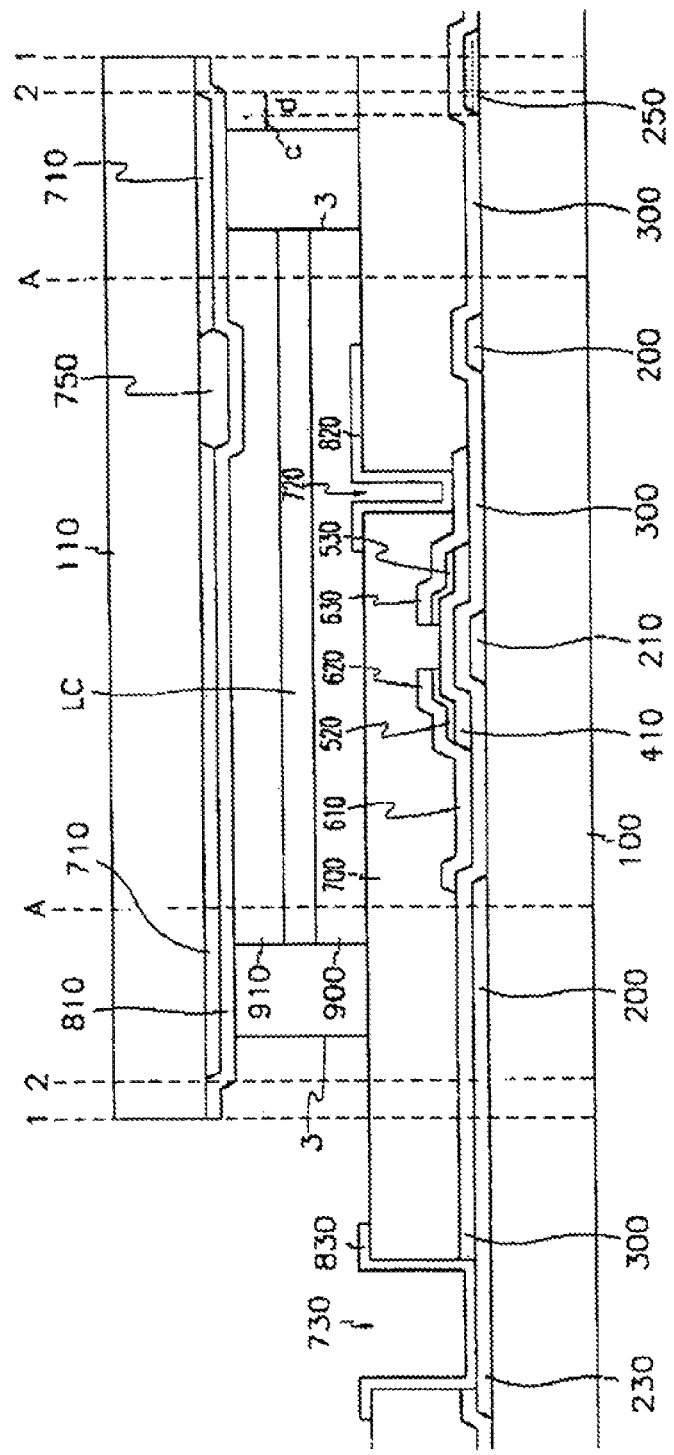
FIG. 12 is a cross sectional view of the liquid crystal display taken along the XII-XII' line of FIG. 11.
Figure 13:
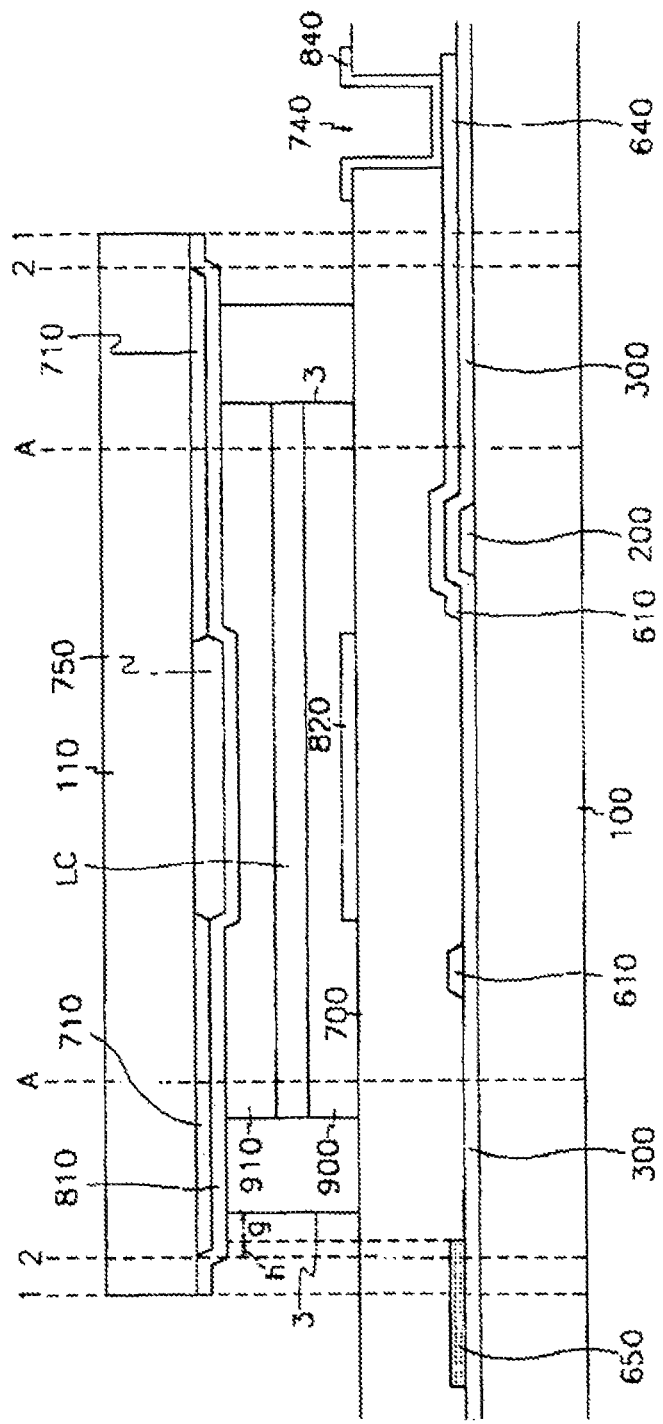
FIG. 13 is a cross sectional view of the liquid crystal display taken along the XIII-XIII' line of FIG. 11.

FIG. 11 is an amplified view of the C portion of the liquid crystal display shown in of FIG. 10. FIG. 12 is a cross sectional view of the liquid crystal display taken along the XII-XII' line of FIG. 11. FIG. 13 is a cross sectional view of the liquid crystal display taken along the XIII-XIIII' line of FIG. 11.

As shown in the drawings, the TFT array substrate 100 is overlaid with a gate line assembly, and first light interception patterns 250. The gate line assembly includes a plurality of gate lines 200, gate electrodes 210 branched from the gate lines 200, and gate pads 230 connected to the end portions of the gate lines 200 to receive scanning signals from the outside and transmit them to the gate lines 200. The gate line assembly and the first light interception patterns 250 are placed on the same plane, and formed together with a conductive metallic material such as aluminum (Al), aluminum alloy, molybdenum (Mo), molybdenum-tungsten alloy (MoW), chrome (Cr), and tantalum (Ta).

The gate line assembly and the first light interception patterns 250 may be formed either with a single layer or with double or more layers. In the case of the double-layered structure, it is preferable that one layer is formed with a material having a low resistance while the other layer being formed with a material having a good contact characteristic. For instance, two layers based on chrome and aluminum or based on aluminum and molybdenum may be provided for the double-layered structure.

The gate line assembly and the first light interception patterns 250 are covered by a gate insulating layer 300. The gate insulating layer 300 may be formed with silicon nitride.

A semiconductor layer 410 is formed on the gate insulating layer 300, and two separate ohmic contact layers 520 and 530 are formed on the semiconductor layer 410 while centering around the gate electrode 210. The semiconductor layer 410 may be formed with amorphous silicon, and the ohmic contact layers 520 and 530 with amorphous silicon into which n-type impurities such as phosphorus (P) are doped.

A data line assembly and second light interception patterns 650 are formed on the ohmic contact layers 520 and 530 and the gate insulating layer 300. The data line assembly includes a plurality of data lines 610, source electrodes 620 branched from the data lines 610, drain electrodes 630 positioned opposite to the source electrodes 620 while centering around the gate electrode 210, and data pads 640 connected to the end portions of the data lines 610 to receive picture signals from the outside and transmit them to the data lines 610. The data line assembly and the second light interception patterns 650 are placed on the same plane, and formed together with a conductive metallic material such as aluminum (Al), aluminum alloy, molybdenum (Mo), molybdenum-tungsten alloy (MoW), chrome (Cr), and tantalum (Ta).

As in the gate line assembly and the first light interception patterns 250, the data line assembly and the second light interception patterns 650 may be formed either with a single layer or with double or more layers.

The second light interception patterns 650 are positioned at the region between the gate pads 230 and the display area A as well as between the neighboring gate lines 200 such that they are not overlapped with the gate lines 200 and the gate pads 230. Likewise, the first light interception patterns 250 are positioned at the region between the data pads 640 and the display area A as well as between the neighboring data lines 610 such that they are not overlapped with the data lines 610 and the data pads 640.

A protective layer 700 is formed on the data line assembly, the second light interception patterns 650, the semiconductor layer 410, and the gate insulating layer 300. The protective layer 700 may be formed with silicon nitride. The protective layer 700 has a contact hole 730 exposing the gate pad 230 together with the gate insulating layer 300, a contact hole 740 exposing the data pad 640, and a contact hole 720 exposing the drain electrode 630.

Pixel electrodes 820, subsidiary gate pads 830, and subsidiary data pads 840 are formed on the protective layer 700 with a transparent material such as indium tin oxide (ITO).

Each pixel electrode 820 is connected to the drain electrode 630 via the contact hole 720. The subsidiary gate pad 830 and the subsidiary data pad 840 are connected to the gate pad 230 and the data pad 640 via the contact holes 730 and 740, respectively. The subsidiary gate and data pads 830 and 840 are provided to enhance adhesion between the gate and data pads 230 and 640 and the external circuits, and to protect the gate and data pads 230 and 640.

An alignment layer 900 is formed on the protective layer 700 and the pixel electrodes 820. In order to align the liquid crystal molecules, the alignment layer 900 may be surface-treated through rubbing or light illumination.

In the meantime, the color filter substrate 110 is overlaid with a black matrix 710, and color filters 750 surrounded by the black matrix 710.

An ITO-based common electrode 810 is formed on the black matrix 710 and the color filters 750, and an alignment layer 910 is formed on the common electrode 810.

The TFT array substrate is assembled with the color filter substrate 110 via a sealer 3, and a liquid crystal LC is injected into the gap between the substrates.

As shown in FIGS. 10 to 13, the borderline of the color filter substrate 110 is indicated by the reference numeral 1, and the borderline of the black matrix 710 indicated by the reference numeral 2. The sealer 3 is positioned outside of the display area A, and the borderline 2 of black matrix 710 is disposed between the borderline 1 of the color filter substrate 110 and the sealer 3.

In view of alignment errors, the first light interception patterns 250 are spaced apart from the data lines 610 by a minimum distance a, and the second light interception patterns 650 are spaced apart from the gate lines 200 by a minimum distance e. Furthermore, the first light interception patterns 250 are spaced apart from the data pads 640 by a reasonable distance b such that they are not overlapped with the data pads 640 as well as TCPs attached thereto in a reliable manner, and the second light interception patterns 650 are spaced apart from the gate pads 230 by a distance f. In addition, the first light interception patterns 250 are spaced apart from the sealer 3 by a distance c, and the second light interception patterns 650 are spaced apart from the sealer 3 by a distance g. As it is desirable that the first and second light interception patterns 250 and 650 do not have a gap with the black matrix 710, they are overlapped with the black matrix 710 by a span d and h in view of the alignment errors.

In case the first and second light interception patterns 250 and 650 are overlapped with the gate and data lines 200 and 610, short circuit may occur between them. Furthermore, in case the first and second light interception patterns 250 and 650 are overlapped with the sealer 3, short circuit may also occur between them when the sealer 3 is compressed for the sealing purpose. In the above structure, even though a small gap exists between the light interception patterns 250 and 650 and the gate and data lines 200 and 610, only negligible amount of light may leak there.

Such light interception patterns 250 and 650 may be also applied to in-plane switching (IPS) type liquid crystal displays where the common electrode and the pixel electrodes are formed at the TFT array substrate, and super twisted nematic (STN) liquid crystal displays where stripe-shaped electrodes cross over at the two substrates without TFTs.

FIGS. 14A to 17B sequentially illustrate the steps of processing the TFT array substrate on a layer by layer base.

Figure 14A:
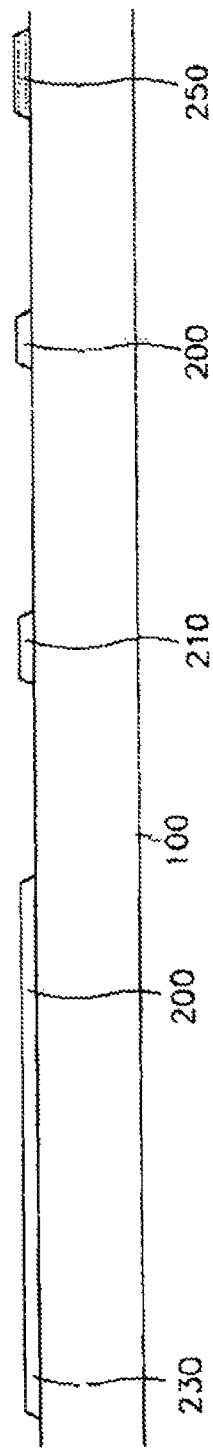
Figure 14B:
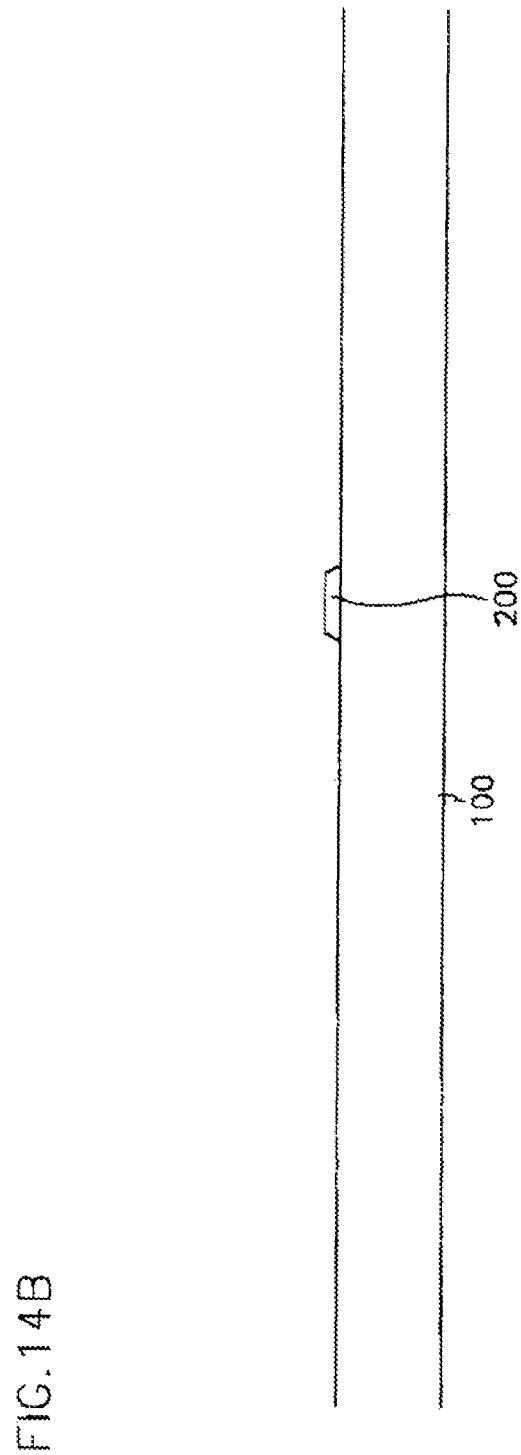

As shown in FIGS. 14A and 14B, a gate line assembly 200, 210 and 230, and first light interception patterns 250 are formed on an insulating substrate 100 through deposition and a first photolithography process.

Thereafter, as shown in FIGS. 15A and 15B, a gate insulating layer 300, a semiconductor layer 410 and an ohmic contact layer 510 are sequentially deposited onto the substrate 100, and the ohmic contact layer 510 and the semiconductor layer 410 are patterned through a second photolithography process.

Figure 16A:
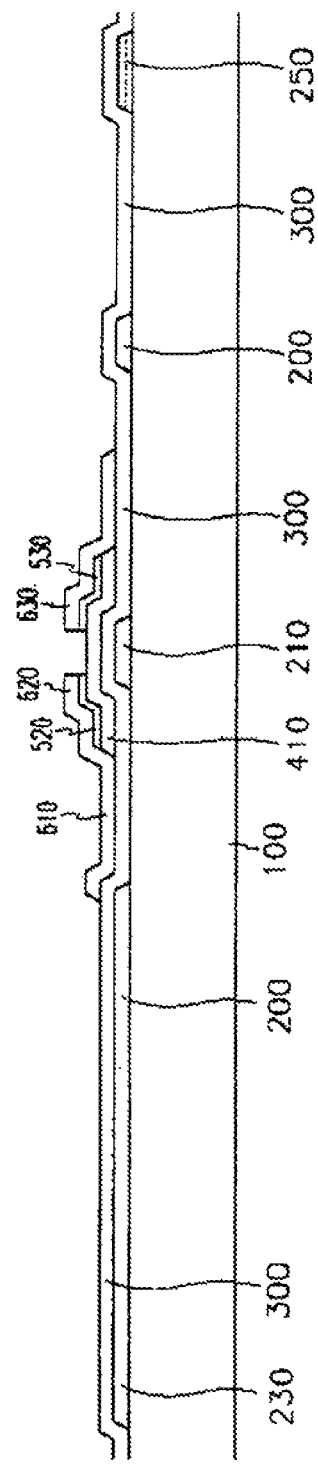

As shown in FIGS. 16A and 16B, a data line assembly 610, 620, 630 and 640, and second light interception patterns 650 are formed through deposition and a third photolithography process. Thereafter, the portion of the ohmic contact layer 510 exposed between the source electrode 620 and the drain electrode 630 is removed such that the ohmic contact layer 510 is separated into two portions 520 and 530 to expose the semiconductor layer 410.

Figure 17A:
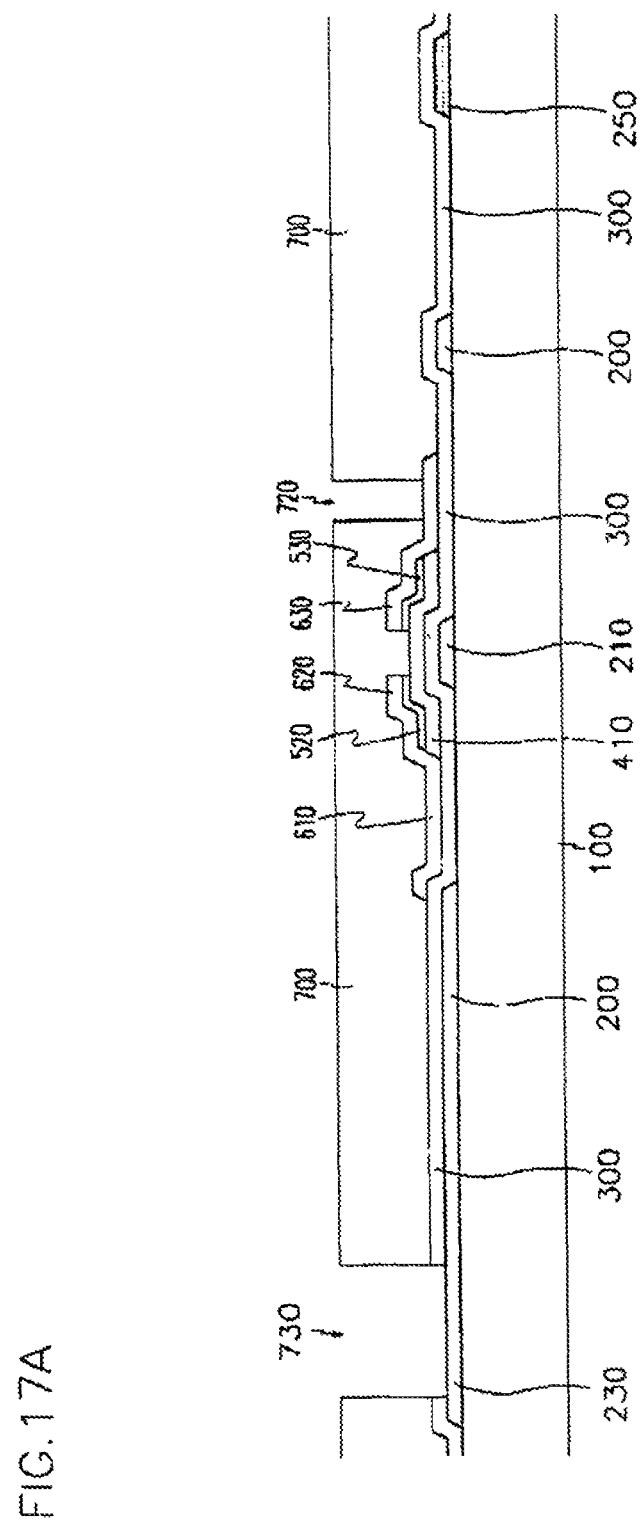
Figure 17B:
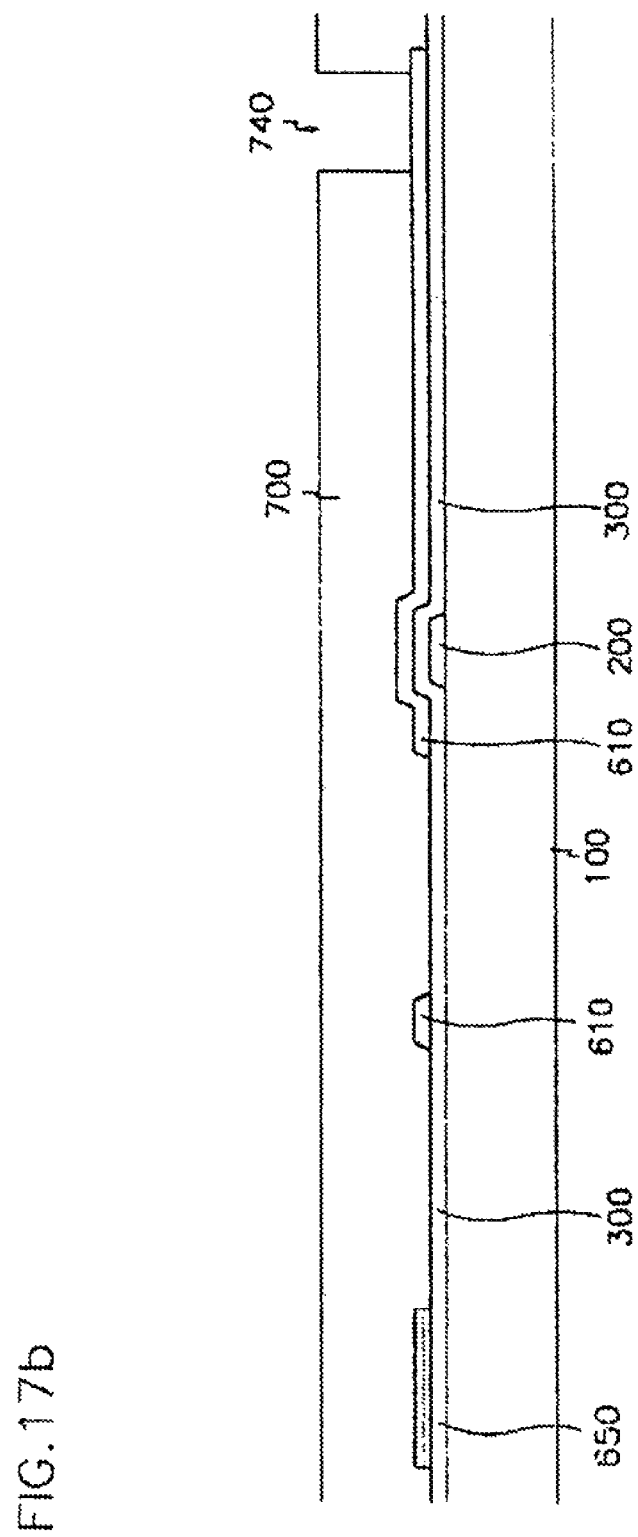

As shown in FIGS. 17A and 17B, a protective layer 700 is deposited onto the substrate 100, and patterned through a fourth photolithography to form contact holes 720, 730 and 740.

Then, as shown in FIGS. 12 and 13, pixel electrodes 820, subsidiary gate pads 830, and subsidiary data pads 840 are formed at the substrate 100 through deposition and a fifth photolithography process. Thereafter, an alignment layer 900 is formed at the substrate 100.

The TFT array substrate 100 is then assembled with the color filter substrate 110 via a sealer 3, and a liquid crystal LC is injected into the gap between the substrates 100 and 110 to complete a liquid crystal panel. In case the alignment layer 900 of the TFT array substrate 100 overlaps the sealer 3, the overlapped portion of the alignment layer 900 is set to be ⅓ of the width of the sealer 3.

Thereafter, semiconductor circuits are mounted onto the liquid crystal panel.

First, an anisotropic conductive film (not shown) is formed at the exposed portion of the TFT array substrate 100 while covering the subsidiary gate and data pads 830 and 840, and TCPs with semiconductor circuits are arranged at the TFT array substrate 100, and thermal-compressed. In this case, the subsidiary pads 830 and 840 are electrically communicated with the TCPs via conductive balls contained in the anisotropic conductive film. This distance of b and f between the light interception patterns 250 and 650 and the pads 230 and 640 prevents possible short circuit via the conductive balls between the light interception patterns 250 and 650 and the subsidiary pads 830 and 840 during the thermal-compression.

Figure 18:
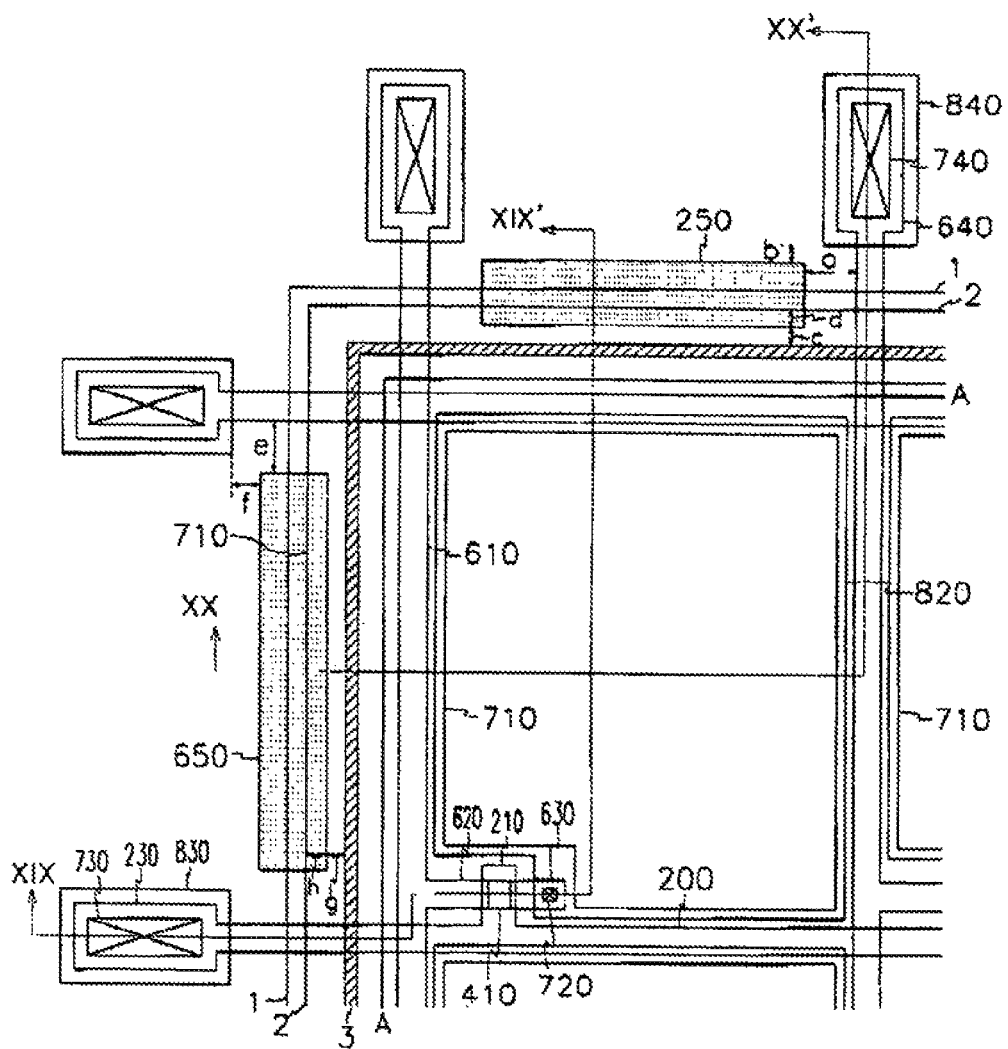
FIG. 18 is a plan view of a liquid crystal display according to a fifth preferred embodiment of the present invention.
Figure 19:
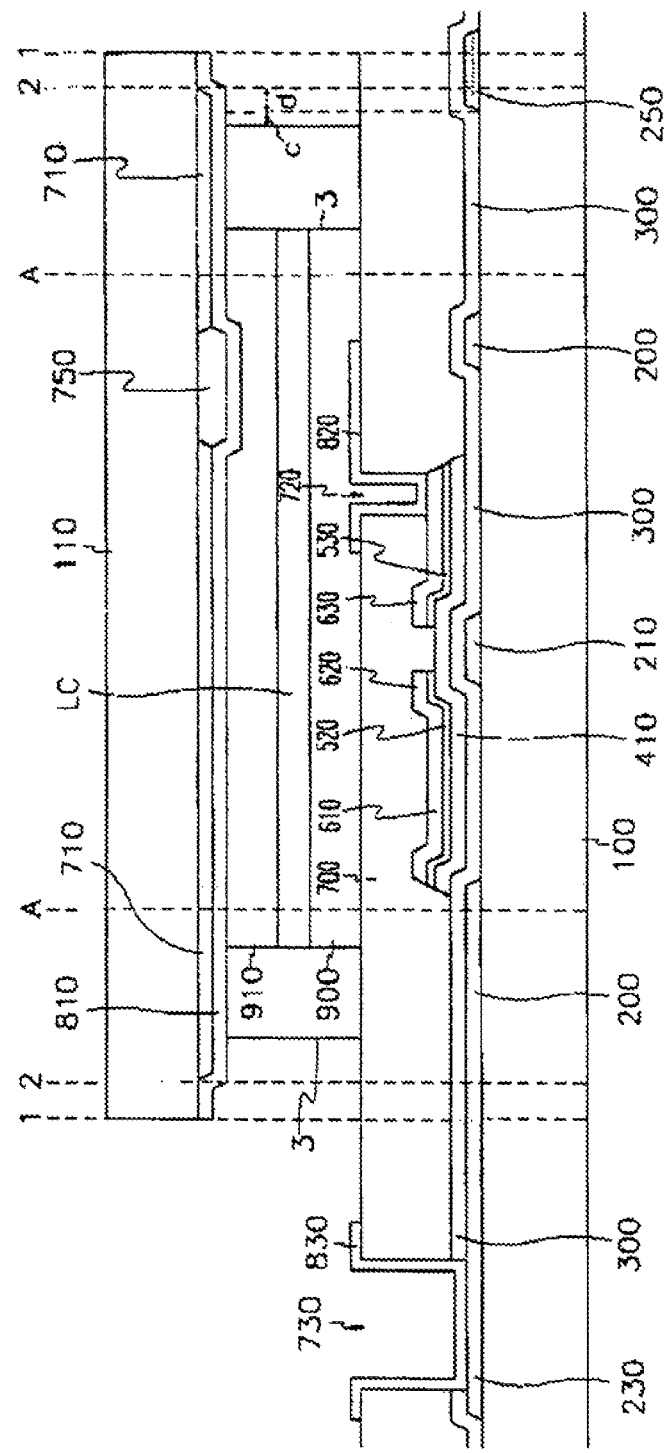
FIG. 19 is a cross sectional view of the liquid crystal display taken along the XIX-XIX' line of FIG. 18.
Figure 20:
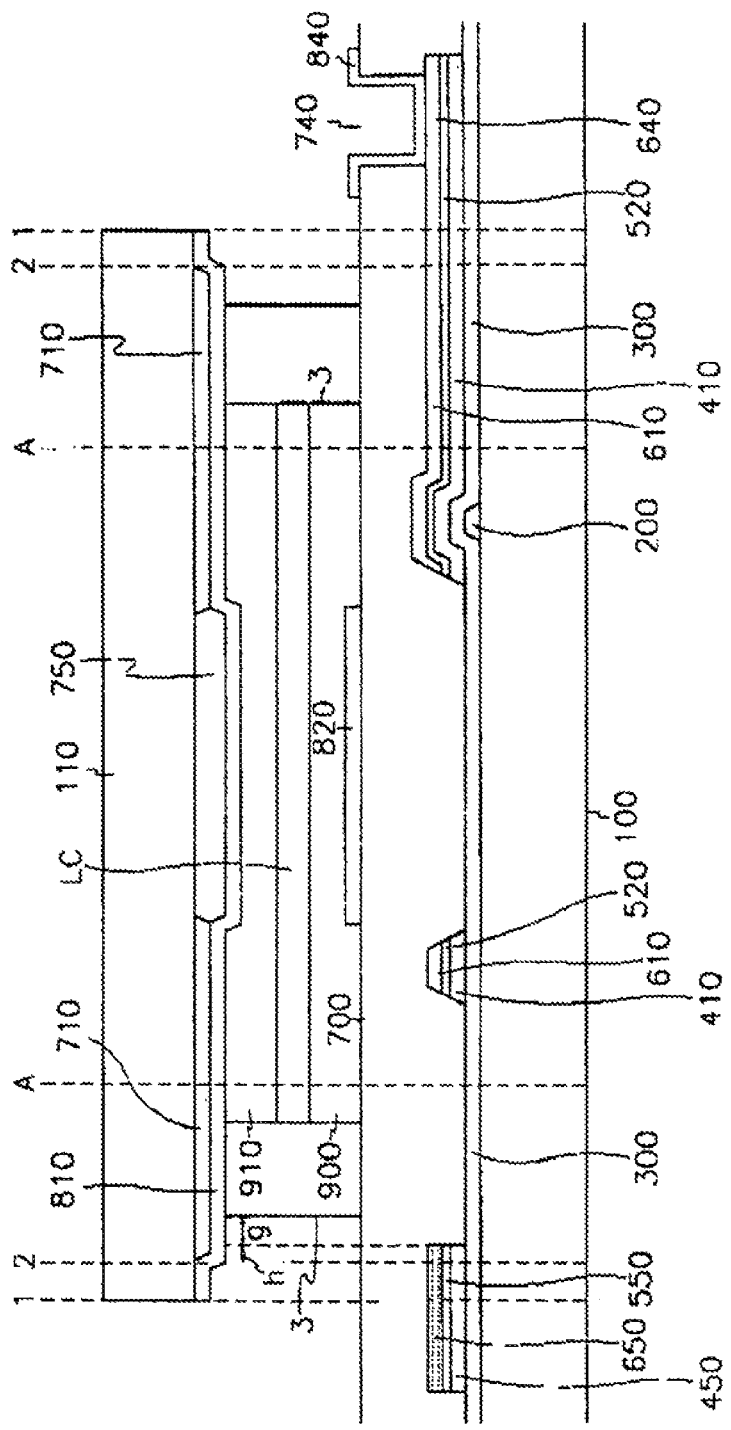
FIG. 20 is a cross sectional view of the liquid crystal display taken along the XX-XX' line of FIG. 18.

FIGS. 18 to 20 illustrate a liquid crystal display according to a fifth preferred embodiment of the present invention. In this preferred embodiment, other components and structures of the liquid crystal display are the same as those related to the fourth preferred embodiment except that ohmic contact layers 520, 530 and 550 and semiconductor layers 410 and 450 are positioned under a data line assembly 610, 620, 630 and 640, and second light interception patterns 650. The shape of the ohmic contact layers 520, 530 and 550 is the same as that of the data line assembly 610, 620, 630 and 640 and the second light interception patterns 650. The shape of the semiconductor layers 410 and 450 is the same as that of the data line assembly 610, 620, 630 and 640 and the second light interception patterns 650 except the portions between the source electrodes 620 and the drain electrodes 630.

The fabrication process for the TFT array substrate is based on the four-mask photolithography.

First, a gate line assembly 200, 210 and 230 and first light interception patterns 250 are formed on an insulating substrate 100 through deposition and a first photolithography process. Thereafter, a gate insulating layer 300 is deposited onto the gate line assembly 200, 210 and 230 and the first light interception patterns 250 while covering them. Semiconductor layers 410 and 450, ohmic contact layers 520, 530 and 550, and a data line assembly 610, 620, 630 and 640 are sequentially deposited, and patterned through a second photolithography process. A protective layer 700 is deposited onto the substrate 100, and patterned through a third photolithography process to thereby form contact holes 720, 730 and 740. Thereafter, pixel electrodes 820, subsidiary gate pads 830 and subsidiary data pads 840 are formed at the substrate 100 through deposition and a fourth photolithography process. Finally, an alignment layer is formed at the substrate 100.

In the second photolithography process, a photoresist film is deposited onto the conductive layer for the data line assembly, and patterned through a mask differentiated in light transmission. The exposed portion of the conductive layer is removed while exposing the underlying ohmic contact layer. The exposed portion of the ohmic contact layer and the underlying semiconductor layer are etched, and the portion of the conductive layer between the source and drain electrodes 620 and 630 is removed. Thereafter, the exposed portion of the conductive layer between the source and drain electrodes 620 and 630 and the underlying ohmic contact layer are etched together. In this way, the semiconductor layers 410 and 450, the ohmic contact layers 520, 530 and 550, the data line assembly 610, 620, 630 and 640, and the second light interception patterns 650 are formed at the substrate 100.

In the resulting liquid crystal display, light interception patterns are provided at the TFT array substrate, and spaced apart from the electrode components of lines, pads, and a sealer so that leakage of light and short circuit can be effectively prevented.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD), comprising:
   a first substrate;
   a second substrate facing the first substrate; and
   a plurality of pixels comprising a plurality of rows and a plurality of columns and divided into a first pixel group comprising only the pixels on a first row and a second pixel group comprising the pixels on a second to last rows,
   wherein the pixels of the first pixel group have a first opening ratio, and the pixels of the second pixel group have a second opening ratio different from the first opening ratio;
   wherein the first opening ratio is smaller than the second opening ratio;
   wherein the first opening ratio is about 60% to about 80% of the second opening ratio; and
   wherein the pixels of the first pixel group have a light interception pattern in an opening, portion.

* * * * *